Jan. 28, 1969 J. R. BORDEN 3,424,331
CONTAINER TO BASE FLEXIBLE CONNECTION
Filed April 21, 1967
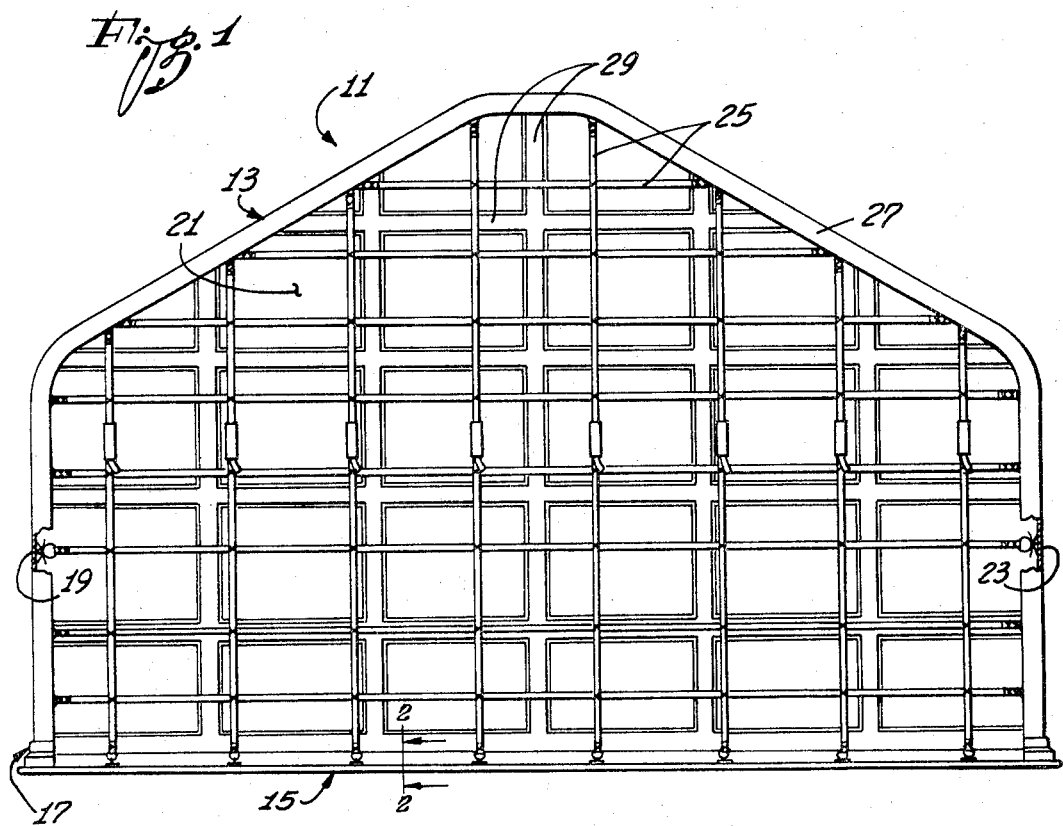
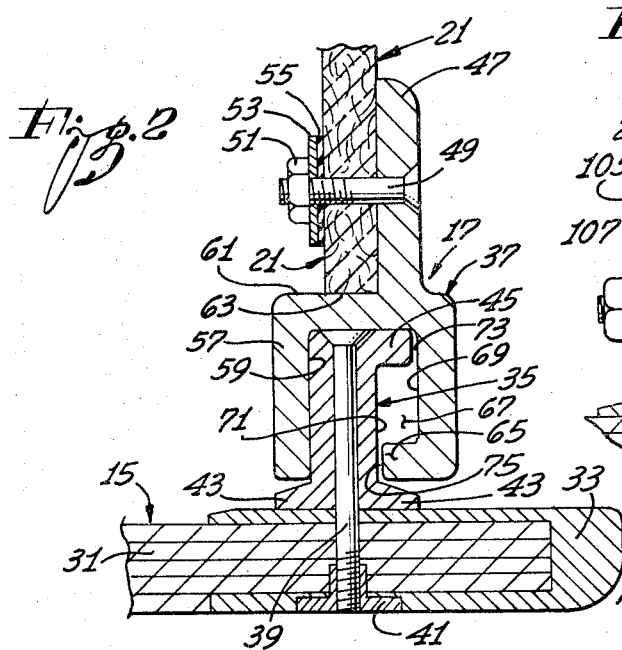
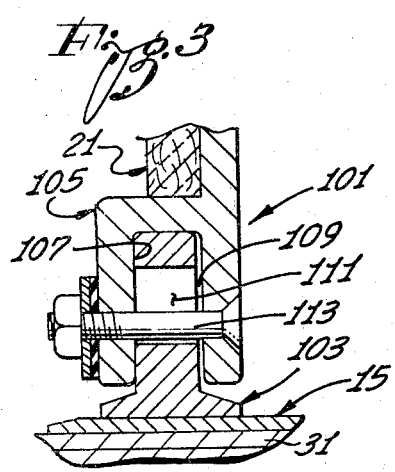
INVENTOR:
John R. Borden
ATTORNEYS

United States Patent Office 3,424,331
Patented Jan. 28, 1969

3,424,331
CONTAINER TO BASE FLEXIBLE CONNECTION
John R. Borden, Manhattan Beach, Calif., assignor, by mesne assignments, to Tridair Industries, Redondo Beach, Calif.
Filed Apr. 21, 1967, Ser. No. 632,820
U.S. Cl. 220—1.5    13 Claims
Int. Cl. B65d 87/00; B65j 1/02

ABSTRACT OF THE DISCLOSURE

This disclosure describes a flexible connection between a container and a base or floor therefor which allows limited relative movement between the base and the container in a direction generally transverse to the plane of the base. Thus, forces acting on the base which distort the base will not be transmitted to the container through the flexible connection.

Background of the invention

To facilitate cargo handling and transporting, it is common practice to unitize or containerize cargo in cargo carrying units. A cargo carrying unit includes a container and a base or pallet attached to the container and forming a floor structure therefor. As the cargo within the cargo carrying unit is supported by the base, the base is a relatively broad and structurally strong member. The container on the other hand forms a cover or shelter for the cargo and is not structurally strong.

When these cargo carrying units are used in aircraft, it is essential that both the base and the container be as light as possible. As the base supports the cargo, it is essential that it possess substantial strength. As the container does not support cargo, it is common practice to construct the container of lightweight material such as Fiberglas. Furthermore, the container walls are made quite thin to further reduce the weight of the container.

The cargo carrying units are subjected to extremely rough use. Thus, even though the base is a relatively strong member, it is subject to deflection or distortion during the rough handling thereof. The relatively large length and width dimensions of the base further contribute to the deflection of the base. For example, when the loaded cargo carrying unit is being moved along a series of rollers in the aircraft, relatively long spans of the base may be unsupported and thereby be subjected to deflection. Furthermore, the base often deflects under the dynamic forces which are encountered during flight of the aircraft.

One problem is that the forces deflecting the pallet are transmitted by the pallet to the container. This causes the container, which is a relatively weak shell, to substantially distort and oftentimes fracture.

Thus, it is necessary to prevent such fracture of the container in response to pallet deflection. The design of a cargo carrying unit should also be substantially watertight and, desirably the container should be relatively easily removable from the base for purposes of repair and maintenance.

Summary of the invention

The present invention eliminates deflection and fracture of the container in response to pallet deflection by flexibly interconnecting the container to the base to allow limited relative movement therebetween. The present invention teaches that such relative movement should occur in a direction which is generally transverse to the pane of the base. This permits the pallet to be subjected to deflection without transmitting such deflection to the relatively weak container.

The present invention also teaches that to further prevent deflection and fracture of the container in response to pallet deflection, it is desirable that the container-to-base connection permit at least slight tilting movement of the container relative to the base. Thus, deflection of the base will not transmit bending forces to the side walls of the container.

Preferably, all of the side walls of the container are flexibly connected to the base as described above. This provides for a maximum strength container-to-base connection and allows complete flexibility. As a minimum, however, it is preferred to provide the flexible container-to-base connection along at least two portions of the container-to-base juncture. Desirably, such two portions should be generally opposed. In this event, the remaining portions of the side walls of the container may be disconnected from the base to thereby obtain complete flexibility. This, however, reduces the strength of the container-to-base connection.

Another concept of the present invention is to make the flexible container-to-base connection substantially watertight. In the interest of assuring watertightness and a strong connection, it is preferred to provide the flexible connections substantially continuously around the lower edge of the side walls of the container.

The above noted concepts and features of this invention can be advantageously embodied in flexible interconnecting means which includes a pair of connector members attached respetcively to the base and at least one of the side walls. One of the connector members preferably has a recess and the other of the connector members preferably has a projection receivable in the recess and movable therein to allow relative movement between the container and the base in a direction generally transverse to the plane of the base. Various means may be provided to prevent withdrawal of the projection from the recess.

This structure may be utilized to form a watertight connection by attaching the connector member having the recess to the side walls of the container and the connector member having the projection to the base. Accordingly, the recess opens downwardly to receive the upwardly extending projection to provide a watertight flexible connection.

To allow relative tilting movement between the container and the base, it is preferred to provide a slight clearance space between a lateral wall of the projection and a lateral wall of the recess. Furthermore, by appropriately sizing and dimensioning the recess and the projection, the recessed connector member may be simply detached from the side wall of the container and easily manipulated to separate the connector members to facilitate repair and maintenance thereof.

The invention, both as to its organization and method of operation, together with further features and advantages thereof, may best be understood by reference to the following description taken in connection with the accompanying illustrative drawings.

Brief description of the drawings

FIG. 1 is a front elevational view of a typical cargo carrying unit embodying the teachings of the present invention.

FIG. 2 is an enlarged fragmentary sectional view taken along line 2—2 of FIG. 1 and illustrating one form of the flexible container-to-base connection.

FIG. 3 is a fragmentary sectional view similar to FIG. 2 showing a second form of flexible container-to-base connection.

Description of the specific embodiment

Referring to the drawings and in particular to FIG. 1 thereof, reference numeral 11 designates a cargo carrying unit constructed in accordance with the teachings of this invention. The unit 11 includes a container or shell 13 secured to a base or pallet 15 by flexible interconnecting means 17.

In the embodiment shown in FIG. 1, the container 13 has three side walls 19, 21, and 23 with the side walls 19 and 23 being arranged at right angles with respect to the side wall 21. Although various constructions are possible, in the embodiment shown in FIG. 1, the fourth side of the container 13 is open. When cargo (not shown) is held within the container 13, the open side of the container 13 may be partially closed by a network of horizontally and vertically extending straps 25.

The container 13 has an upper wall or roof 27 and the roof and the side walls 19, 21, and 23 may be provided with a series of corrugations 29. The vertically extending straps 25 are secured at one end to the base 15 and at the other end to the roof 27. The horizontally extending straps 25 are secured at their opposite ends to the side walls 19 and 23.

Cargo is supported within the unit 11 by the base 15. In use of the unit 11, the base 15 is subjected to deflection and it is desirable to prevent such deflection from being transmitted by the base 15 to the container 13 as the container is constructed of thin lightweight material such as Fiberglas and is not structurally strong.

FIG. 2 shows the details of one form of flexible interconnecting means 17 constructed in accordance with the teachings of this invention. Although FIG. 2 shows the interconnecting means as it appears along the side wall 21, it should be understood that the section shown in FIG. 2 is typical.

The base 15 may be constructed from a sandwich construction 31 having a lightweight wood core. A strong metal edge member 33 of U-shaped cross section extends susbtantially continuously around the periphery of the base. The edge member 33 strengthens the base 15 and protects the sandwich construction 31.

The flexible interconnecting means 17 includes a male connector member 35 and a female connector 37 rigidly affixed to the base 15 and the lower edge portion of the side wall 21, respectively. Each of the connector members 35 and 37 are preferably elongated lightweight metal extrusions which extend substantially continuously for the full length of the side wall 21. Similar connector members may likewise extend along the full length of the side walls 19 and 23 to similarly interconnect these side walls to the base 15. Of course, several pairs of the connector members 35 and 37 may be used along each of the side walls of the container 13, if desired. Similarly, the connector members 35 and 37 need not be elongated as the flexibility feature of this invention is applicable to nonelongated connectors. In the specific embodiment illustrated in FIG. 2 the cross section of the flexible interconnecting means 17 may be considered to extend substantially continuously along the full length of the side walls 19, 21, and 23.

The connector member 35 is suitably secured to the base 15 closely adjacent the outer edge thereof by bolts 39 and nuts 41 (only one of each being shown in FIG. 2) which are mounted flush with the upper surface of the connector member 35 and the lower surface of the edge member 33, respectively. The connector member 35 has opposed laterally extending feet 43 which rest on the upper surface of the edge member 33 to assist in stably mounting the connector member on the base 15. The connector member 35 extends upwardly from the base 15 and terminates in a flange 45 which projects outwardly toward the periphery of the unit 15 and preferably extends continuously for the full elongated length of the connector member 35.

The female connector member 37 has an upstanding attachment flange 47 which preferably extends the full length of the side wall 21 and is securely attached to a lower edge portion of the side wall 21 by a bolt 49 and a nut 51. Several of the bolts 49 may be provided along the length of the attachment flange 47 to provide a secure attachment. A washer 53 and a resilient gasket 55 may be provided intermediate the nut 51 and the inner surface of the side wall 21.

A channel shaped portion 57 is formed integrally with the attachment flange 47 and has a recess 59 opening downwardly and receiving the male connector member 35. The upper end of the channel shaped portion 57 defines a shoulder 61 on which a lower edge 63 of the side wall 21 rests. Thus, the shoulder 61 constitutes the primary support for the side wall 21.

The recess 59 is generally rectangular in cross section except for a flange 65 which extends inwardly into the recess at the lower end thereof to reduce the cross-sectional area of the recess. As is apparent from viewing FIG. 2, there is a space 67 intermediate the flanges 65 and 45 of the connector members 37 and 35, respectively, which permits relative movement of the connector member 37 relative to the connector member 35 in a direction generally transverse to the plane of the base 15. Furthermore, the ends of the flanges 45 and 65 terminate short of an inner lateral surface 69 of the connector member 37 and a lateral surface 71 of the connector member 35 to define clearance spaces 73 and 75, respectively. The clearance spaces 73 and 75 allow for limited relative tilting movement between the connector members 35 and 37 about an axis extending generally parallel to the base 15 and the side wall 21. Furthermore, such slight clearance spaces 73 and 75 allow for limited relative lateral movement between the connector members 35 and 37.

In the normal condition, when the base 15 is not being deflected, the connector member 37 is supported on the upper surface of the connector member 35. Similarly, the side wall 21 is supported on the shoulder 63 of the connector member 37 and extends upwardly generally perpendicular to the base 15. The side wall 21 is preferably vertically above the connector member 35 so that all load from the weight of the container 13 is transmitted directly through the connector member 35 to the base 15.

If the base 15 should undergo deflections so as to tend to separate the connector members 35 and 37, it is apparent that the base 15 may move downwardly relative to the side wall 21 as permitted by the space 67. Similarly, the clearance spaces 73 and 75 allow limited lateral and tilting movement between the base 15 and the side wall 21. With the recess 59 of the female connector member 37 opening downwardly, there is substantially no chance for water to leak through the flexible connection.

The connecting means 17 can be simply disassembled by removing the bolts 49 and the container 13. Next, the connector member 37 may be lifted upwardly until the flanges 65 and 45 are in substantial engagement at which time the connector member 37 can be tilted clockwise as viewed in FIG. 2 to permit withdrawal or separation of the two connector members. The size of the spaces 67, 73, and 75 may be varied depending upon the amount of deflection which it is anticipated that the base 15 will undergo and depending upon the extent to which it is desired to isloate the container 13 from the deflection of the base.

FIG. 3 illustrates a flexible interconnecting means 101 which represents a second embodiment of the present invention. The flexible interconnecting means 101 includes a male connector member 103 and a female connector member 105 which are secured, respectively, to the base 15 and to a lower edge portion of the side wall 21 in the same manner as described above in connection with the embodiment of FIG. 2. This connector member 103 extends upwardly from the base 15 closely adjacent the edge thereof and has no flange similar to the flange 45 of the connector member 35. The connector member 105 is very similar to the connector member 37 except that the former has no flange similar to the flange 65. Thus, the connector member 105 is generally U-shaped in cross section and defines a downwardly opening recess 107. The recess 107 has a slightly greater width than the width of the connector member 103 to define a clearance space 109 which permits limited relative lateral and tilting movement between the connector members 103 and 105.

To limit the amount of relative movement that can occur between the connector members 103 and 105 in a direction generally transverse to the base 15, the connector member 103 is provided with a plurality of vertically extending slots 111 (only one being shown in FIG. 3). The slots 111 are suitably distributed along the length of the connector member 103. A pin 113 which may be in the form of a bolt is suitably connected to the connector member 105 and extends through the slot 111. Of course, one of the pins 113 can be provided for each of the slots 111. Thus, the amount of relative movement between the connector members 103 and 105 in a direction generally transverse to the plane of the base 15 is limited by the vertical extent of the slots 111.

As the recess 107 opens downwardly and the connector members 103 and 105 preferably extend continuously for the full length of the side 21, the flexible interconnecting means 101 is also substantially watertight. Disassembly can also be easily accomplished by merely removing the pin 115. Of course, other forms of flexible interconnecting means embodying the teachings of the present invention could be constructed and the forms illustrated in FIGS. 2 and 3 are merely illustrative.

I claim:

1. In a device for containerizing cargo, the combination of:
   a container having side walls forming at least a partial enclosure;
   a broad base for carrying the cargo;
   said container being positionable on said base with the side walls of said container lying closely adjacent said base whereby the base forms a floor structure for said container;
   a pair of connector members attached respectively to said base and to at least one of said side walls;
   one of said connector members having a recess and the other of said connector members having a projection receivable in said recess and movable therein to allow relative movement between said container and said base in a direction generally transverse to the plane of said base;
   said connector members including means for preventing withdrawal of said projection from said recess;
   each of said connector members, said projection and said recess being elongated in the direction of the juncture between said one side wall and said base and extending for a substantial distance there along, said container having a second side wall generally opposite said one side wall; and
   flexible means for connecting said second side wall to said base to allow relative movement between said second side wall and said base.

2. The combination as defined in claim 1 wherein said last mentioned means includes a flange on said one connector member projecting inwardly into the recess to reduce the cross sectional area thereof and a cooperating flange on said other connector member.

3. A combination as defined in claim 1 wherein the connector member attached to said one side wall includes an attachment flange overlapping a lower portion of said one side wall and defining a shoulder in substantially abutting relationship with the lower edge of said one side wall to support said one side wall.

4. In a device for containerizing cargo, the combination of:
   a container having side walls forming at least a partial enclosure;
   a broad base for carrying the cargo;
   said container being positionable on said base with the side walls of said container lying closely adjacent said base whereby the base forms a floor structure for said container;
   a pair of connector members attached respectively to said base and to at least one of said side walls;
   one of said connector members having a recess and the other of said connector members having a projection receivable in said recess and movable therein to allow relative movement between said container and said base in a direction generally transverse to the plane of said base;
   said connector members including means for preventing withdrawal of said projection from said recess; and
   said connector members being elongated in the direction of the juncture between said one side wall and said base, said one connector member being attached to said one side wall with the recess opening downwardly toward said base, said other connector member being attached to said base with the projection extending upwardly and being received in said recess whereby said connector members form a substantially flexible joint between said one side wall and said base.

5. A combination as defined in claim 4 wherein the said container has at least three side walls and is structurally weaker than said base, said one connector member having an attachment flange overlapping a lower portion of said one side wall and defining a shoulder for supporting the lower edge of said one side wall, and flexible means are provided for connecting the other of said side walls of said container to said base to allow relative movement between said other side walls and said base in a direction generally transverse to the plane of said base.

6. A combination as defined in claim 4 wherein said projection is spaced slightly from the wall of said recess to allow limited tilting movement between said container and said base.

7. In a device for containerizing cargo, the combination of:
   a container having side walls forming at least a partial enclosure;
   a base for carrying the cargo, said base being subject to structural distortion in response to the application of substantial force thereto, said base being substantially structurally stronger than said container;
   said container being positionable on said base with the side walls of said container lying closely adjacent said base whereby said base forms a strong floor structure for said container; and
   interconnecting means rigidly affixed to the side walls of said container and said base for attaching the side walls of said container to said base, said interconnecting means including means responsive to deflection of said base for allowing limited relative movement between said base and said container in a direction generally transverse to the plane of said base without collapsing the side walls of the container whereby forces acting on and distorting said base are not transmitted to said container through said interconnecting means.

8. A combination as defined in claim 7 wherein said last mentioned means allows simultaneous movement of said base relative to all of the side walls of the container.

9. A combination as defined in claim 7 wherein said last mentioned means also allows relative limited tilting movement between said container and said base.

10. A combination as defined in claim 7 wherein said last mentioned means also allows limited movement of said container relative to said base in a direction generally parallel to said base, said limited movement generally parallel to said base being considerably less than said limited movement transverse to said base.

11. A combination as defined in claim 7 wherein said interconnecting means extends continuously along substantially the full length of the side walls.

12. In a device for containerizing cargo, the combination of:
  a container having side walls forming at least a partial enclosure;
  a broad base for carrying the cargo;
  said container being positionable on said base with the side walls of said container lying closely adjacent said base whereby the base forms a floor structure for said container;
  a pair of connector members attached respectively to said base and to at least one of said side walls;
  one of said connector members defining a groove opening toward the other of said connector members and terminating inwardly in an abutment, said other connector member having a projection receivable in said groove and engageable with said abutment, said other connector member being movable in said groove to allow relative movement between said container and said base in a direction generally transverse to the plane of said base; and
  said connector members including means for preventing complete withdrawal of said projection from said groove.

13. A combination as defined in claim 12 wherein said last mentioned means includes an opening extending through said projection and a pin extending through said opening and joined to said one connector member.

References Cited

UNITED STATES PATENTS

| | | |
|---|---|---|
| 1,614,705 | 1/1927 | Amsler. |
| 2,553,273 | 5/1951 | Phillips _____ 220—6 X |
| 2,989,207 | 6/1961 | Clar et al. _____ 220—76 X |

RAPHAEL H. SCHWARTZ, *Primary Examiner.*